United States Patent
Gehtman et al.

(10) Patent No.: US 11,822,656 B2
(45) Date of Patent: Nov. 21, 2023

(54) DETECTION OF UNAUTHORIZED ENCRYPTION USING DEDUPLICATION EFFICIENCY METRIC

(71) Applicant: EMC IP Holding Company LLC, Hopkinton, MA (US)

(72) Inventors: Yevgeni Gehtman, Modi'ln (IL); Maxim Balin, Gan Yavne (IL); Tomer Shachar, Omer (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 414 days.

(21) Appl. No.: 17/083,428

(22) Filed: Oct. 29, 2020

(65) Prior Publication Data
US 2022/0138320 A1    May 5, 2022

(51) Int. Cl.
G06F 21/56 (2013.01)
G06F 21/78 (2013.01)
G06F 21/60 (2013.01)
G06F 3/06 (2006.01)

(52) U.S. Cl.
CPC ............ *G06F 21/565* (2013.01); *G06F 3/062* (2013.01); *G06F 3/067* (2013.01); *G06F 3/0641* (2013.01); *G06F 3/0653* (2013.01); *G06F 3/0659* (2013.01); *G06F 21/568* (2013.01); *G06F 21/602* (2013.01); *G06F 21/78* (2013.01)

(58) Field of Classification Search
CPC .... G06F 21/565; G06F 21/568; G06F 21/602; G06F 21/78; G06F 3/062; G06F 3/0641; G06F 3/0653; G06F 3/0659; G06F 3/067
See application file for complete search history.

(56) References Cited

U.S. PATENT DOCUMENTS

| | | | |
|---|---|---|---|
| 11,588,633 B1* | 2/2023 | Sapuntzakis | G06F 3/0673 |
| 11,615,185 B2* | 3/2023 | Lee | G06F 21/566 |
| | | | 726/23 |
| 2019/0109870 A1* | 4/2019 | Bedhapudi | H04L 63/0428 |
| 2019/0235973 A1* | 8/2019 | Brewer | G06F 11/1469 |

(Continued)

OTHER PUBLICATIONS https://www.hhs.gov/sites/default/files/nist800111.pdf.

(Continued)

*Primary Examiner* — Hee K Song
(74) *Attorney, Agent, or Firm* — Ryan, Mason & Lewis, LLP

(57) ABSTRACT

Techniques are provided for detection of unauthorized encryption using one or more deduplication efficiency metrics. One method comprises obtaining a deduplication efficiency value for a deduplication operation in a storage system; evaluating the deduplication efficiency value for the deduplication operation relative to an expected deduplication efficiency value; and performing one or more automated remedial actions, such as generating an alert notification, in response to the evaluating satisfying one or more deduplication criteria. A count of a number of concurrent users may be compared to an expected number of concurrent users, and/or (ii) a count of a number of concurrent sessions for a given user may be compared to an expected number of concurrent sessions for the given user. A ransomware alert or an unauthorized encryption alert may be generated when the evaluating and/or the comparison satisfy predefined attack criteria.

20 Claims, 6 Drawing Sheets

(56) References Cited

U.S. PATENT DOCUMENTS

2021/0049277 A1* 2/2021 Mueller-Wicke ..... G06F 21/554
2021/0216633 A1* 7/2021 Lee ..................... G06F 21/6218

OTHER PUBLICATIONS https://www.oreilly.com/library/view/the-architecture-of/9781491904503/ch04.html.
https://blog.integrityts.com/data-storage-security.
https://ico.org.uk/for-organisations/guide-to-data-protection/guide-to-the-general-data-protection-regulation-gdpr/encryption/encryption-and-data-storage/.
https://www.enterprisestorageforum.com/storage-management/data-storage-security-guide.html.

* cited by examiner

DETECTION OF UNAUTHORIZED ENCRYPTION USING DEDUPLICATION EFFICIENCY METRIC

FIELD

The field relates generally to information processing systems and more particularly, to the processing of data in such information processing systems.

BACKGROUND

In a storage system, there is typically no active functionality to detect and differentiate between legitimate and non-legitimate encryption within the storage system. Thus, when a cyber criminal obtains access into a restricted portion of a storage system, the cyber criminal can often encrypt desired files and/or copy the files without detection. For example, ransomware techniques can be employed to encrypt data and prevent access to the encrypted data until a ransom is paid.

A need therefore exists for improved techniques for detecting unauthorized encryption.

SUMMARY

In one embodiment, a method comprises obtaining a deduplication efficiency value for one or more deduplication operations in at least a portion of a storage system; evaluating the deduplication efficiency value for the one or more deduplication operations relative to an expected deduplication efficiency value; and performing one or more automated remedial actions in response to the evaluating satisfying one or more deduplication criteria, such as generating an alert notification.

In some embodiments, (i) a count of a number of concurrent users is compared to an expected number of concurrent users, and/or (ii) a count of a number of concurrent sessions for a given user is compared to an expected number of concurrent sessions for the given user. An alert may be generated when one or more of the evaluating and the comparison satisfy predefined criteria.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for detection of unauthorized encryption using one or more deduplication efficiency metrics.

In one or more embodiments, unauthorized encryption detection techniques are provided to detect and differentiate between legitimate and non-legitimate encryption within a storage system, storage system components and/or designated areas of a storage system.

Figure 1:
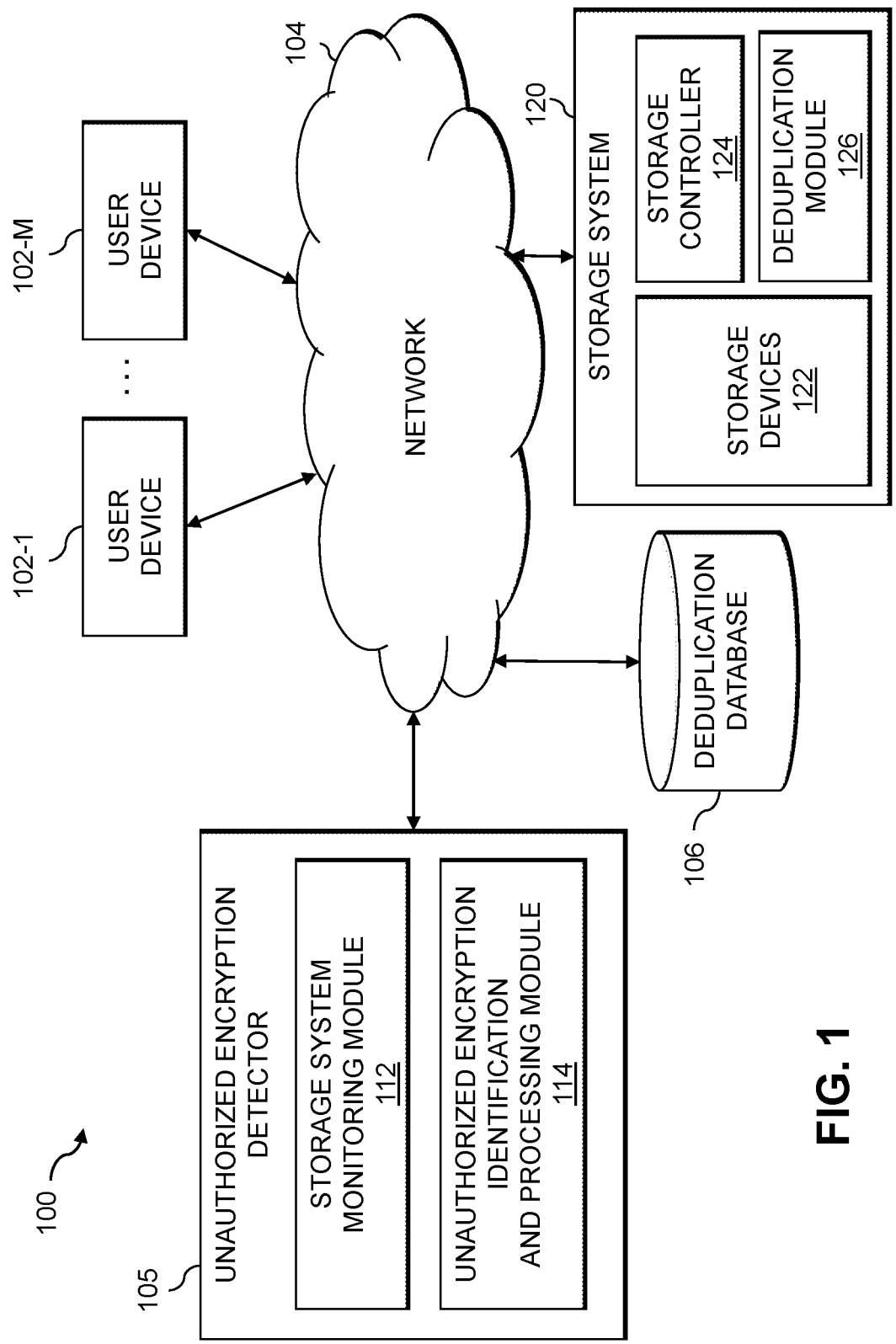
FIG. 1 illustrates an information processing system configured for detection of unauthorized encryption using one or more deduplication efficiency metrics in accordance with an illustrative embodiment.

FIG. 1 shows a computer network (also referred to herein as an information processing system) 100 configured in accordance with an illustrative embodiment. The computer network 100 comprises a plurality of user devices 102-1 through 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is unauthorized encryption detector 105, deduplication database 106 and a storage system 120.

The user devices 102 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." The user devices 102 may comprise a network client that includes networking capabilities such as ethernet, Wi-Fi, etc. When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices. Such applications illustratively generate input-output (TO) operations that are processed by the storage system 120. The term "input-output" as used herein refers to at least one of input and output. For example, IO operations may comprise write requests and/or read requests directed to logical addresses of a particular logical storage volume of the storage system 120. These and other types of IO operations are also generally referred to herein as IO requests.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-

Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage system 120 illustratively comprises processing devices of one or more processing platforms. For example, the storage system 120 can comprise one or more processing devices each having a processor and a memory, possibly implementing virtual machines and/or containers, although numerous other configurations are possible.

The storage system 120 can additionally or alternatively be part of cloud infrastructure such as an Amazon Web Services (AWS) system. Other examples of cloud-based systems that can be used to provide at least portions of the storage system 120 include Google Cloud Platform (GCP) and Microsoft Azure.

The user devices 102 and the storage system 120 may be implemented on a common processing platform, or on separate processing platforms. The user devices 102 (for example, when implemented as host devices) are illustratively configured to write data to and read data from the storage system 120 in accordance with applications executing on those host devices for system users.

The storage system 120 comprises a plurality of storage devices 122, an associated storage controller 124 and a deduplication module 126. The storage devices 122 store data of a plurality of storage volumes, such as respective logical units (LUNs) or other types of logical storage volumes. The term "storage volume" as used herein is intended to be broadly construed, and should not be viewed as being limited to any particular format or configuration.

An exemplary process utilizing deduplication module 126 of an example storage system 120 in computer network 100 will be described in more detail with reference to the flow diagrams of, for example, FIGS. 3 and 4.

The storage devices 122 of the storage system 120 illustratively comprise solid state drives (SSDs). Such SSDs are implemented using non-volatile memory (NVM) devices such as flash memory. Other types of NVM devices that can be used to implement at least a portion of the storage devices 122 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system 120.

It is therefore to be appreciated numerous different types of storage devices 122 can be used in storage system 120 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

In some embodiments, communications between the user devices 102 (for example, when implemented as host devices) and the storage system 120 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the user devices 102 to communicate with the storage system 120 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The user devices 102 are configured to interact over the network 104 with the storage system 120. Such interaction illustratively includes generating IO operations, such as write and read requests, and sending such requests over the network 104 for processing by the storage system 120. In some embodiments, each of the user devices 102 comprises a multi-path input-output (MPIO) driver configured to control delivery of IO operations from the host device to the storage system 120 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 120.

The MPIO driver may comprise, for example, an otherwise conventional MPIO driver, such as a PowerPath® driver from Dell EMC. Other types of MPIO drivers from other driver vendors may be used.

The storage controller 124 and the storage system 120 may further include one or more additional modules and other components typically found in conventional implementations of storage controllers and storage systems, although such additional modules and other components are omitted from the figure for clarity and simplicity of illustration.

The storage system 120 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the user devices 102 (for example, when implemented as host devices) may be implemented in whole or in part on the same processing platform as the storage system 120 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 102 and the storage system 120 to reside in different data centers. Numerous other distributed implementations of the host devices and the storage system 120 are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The unauthorized encryption detector 105 may be implemented, for example, on the cloud or on the premises of an enterprise or another entity. In some embodiments, the unauthorized encryption detector 105, or portions thereof, may be implemented as part of the storage system 120 or on a host device. As also depicted in FIG. 1, the unauthorized encryption detector 105 further comprises a storage system monitoring module 112 and an unauthorized encryption identification and processing module 114.

It is to be appreciated that this particular arrangement of modules 112 and 114 illustrated in the unauthorized encryption detector 105 of the FIG. 1 embodiment is presented by way of example only, and alternative arrangements can be used in other embodiments. For example, the functionality associated with modules 112 and 114 in other embodiments can be combined into a single module, or separated across a larger number of modules. As another example, multiple distinct processors can be used to implement different ones of modules 112 and 114 or portions thereof.

At least portions of modules 112 and 114 may be implemented at least in part in the form of software that is stored in memory and executed by a processor. An exemplary process utilizing modules 112 and 114 of an example unauthorized encryption detector 105 in computer network 100 will be described in more detail with reference to the flow diagrams of, for example, FIGS. 3 and 4.

Additionally, the unauthorized encryption detector 105 can have an associated deduplication database 106 configured to store, for example, fingerprints for one or more files that are used for the deduplication The deduplication database 106 in the present embodiment is implemented using one or more storage systems associated with the unauthorized encryption detector 105. Such storage systems can comprise any of a variety of different types of storage including NAS, SANs, DAS and distributed DAS, as well as combinations of these and other storage types, including software-defined storage.

Also associated with the unauthorized encryption detector 105 can be one or more input-output devices (not shown), which illustratively comprise keyboards, displays or other types of input-output devices in any combination. Such input-output devices can be used, for example, to support one or more user interfaces to the unauthorized encryption detector 105, as well as to support communication between the unauthorized encryption detector 105 and other related systems and devices not explicitly shown.

The user devices 102 and the unauthorized encryption detector 105 in the FIG. 1 embodiment are assumed to be implemented using at least one processing device. Each such processing device generally comprises at least one processor and an associated memory, and implements one or more functional modules for controlling certain features of the unauthorized encryption detector 105.

More particularly, user devices 102 and unauthorized encryption detector 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the user devices 102 and/or the unauthorized encryption detector 105 to communicate over the network 104 with each other (as well as one or more other networked devices), and illustratively comprises one or more conventional transceivers.

It is to be understood that the particular set of elements shown in FIG. 1 for detection of unauthorized encryption using one or more deduplication efficiency metrics is presented by way of illustrative example only, and in other embodiments additional or alternative elements may be used. Thus, another embodiment includes additional or alternative systems, devices and other network entities, as well as different arrangements of modules and other components.

Figure 2:
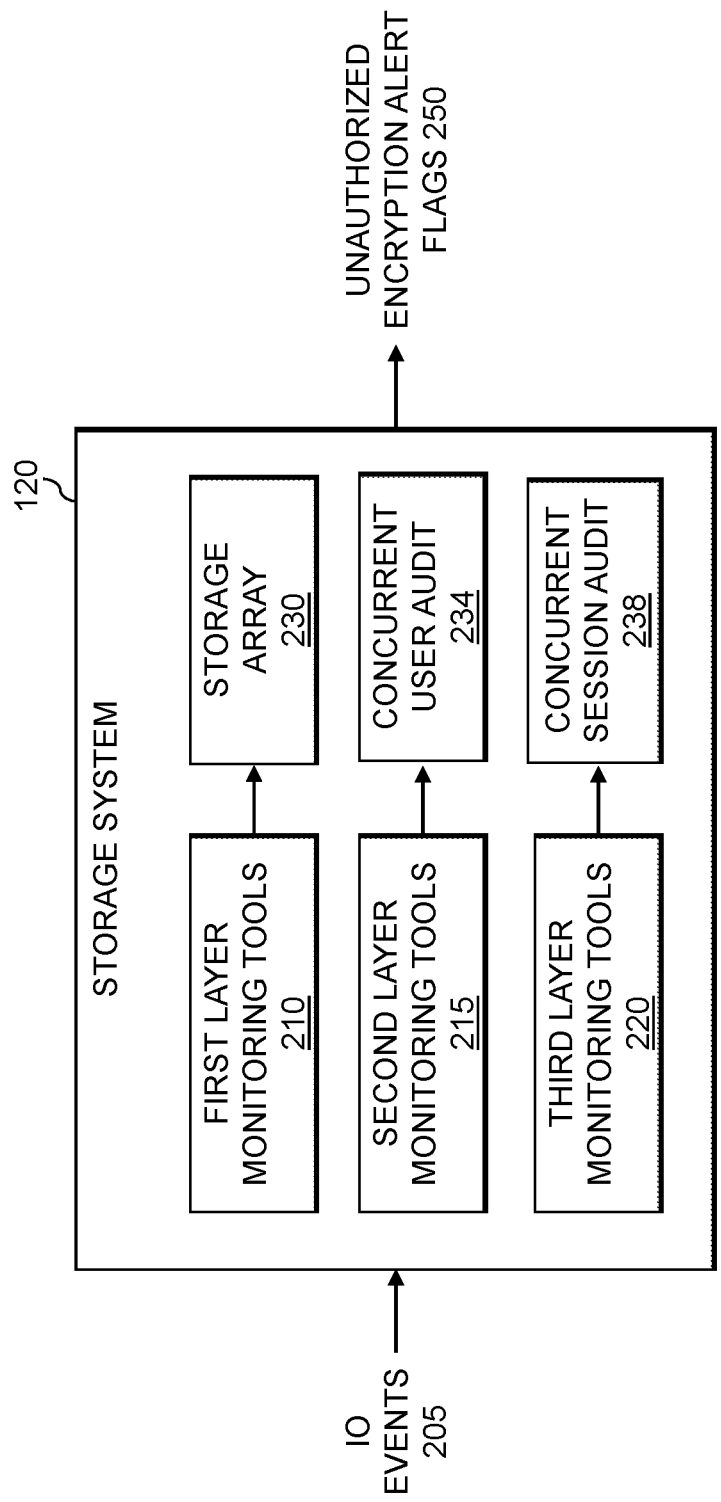
FIG. 2 illustrates the storage system of FIG. 1 in further detail, according to an embodiment of the disclosure.

FIG. 2 illustrates the storage system 120 of FIG. 1 in further detail, according to an embodiment of the disclosure. As shown in FIG. 2, the exemplary storage system 120 receives IO events 205 and comprises first layer monitoring tools 210, second layer monitoring tools 215, third layer monitoring tools 220, a storage array 230, a concurrent user audit 234 and a concurrent session audit 238.

In one or more embodiments, first layer monitoring tools 210 are employed to detect unauthorized encryption in the storage array 230, as discussed further below, for example, in conjunction with FIG. 3. In some embodiments, discussed further below, the first layer monitoring tools 210 monitor a success rate (e.g., a deduplication efficiency value) of a deduplication process. To illustrate, consider a folder X. In an initial run, files start "flowing" into the folder X.

During a second and subsequent run, the first layer monitoring tools 210 examine the new "set" of files and accumulate them into various categories (e.g., based on a status of the current files (such as compress/encrypted or none). Then, the first layer monitoring tools 210 differentiate between various "sets" of files regarding their historical changes. Thereafter, the "sets" of files are compared to a baseline that detects if the system is acting normally (e.g., not exhibiting abnormal behavior) or misbehaving (e.g., exhibiting abnormal behavior).

One or more embodiments of the techniques for detecting unauthorized encryption using one or more deduplication efficiency metrics recognize that a modern storage system 120 writes on the order of 1-10 million IOs. A typical folder has approximately only 1-10 encrypted/compressed files and a deduplication success rate of 99.99% or more. A deduplication process is typically not performed on compressed or encrypted files, by design. When a ransomware virus is launched (and it typically does not stop until all file are encrypted, and also encrypts when new files are added), essentially all of the files (if not locked by the operating system) will be encrypted. Thus, following a ransomware attack, the deduplication success rate will fall to near zero (e.g., approximately 0.01%).

As discussed further below in conjunction with FIG. 3, the first layer monitoring tools 210 evaluate the deduplication efficiency to detect unauthorized encryptions. In addition, in at least some embodiments, the second layer monitoring tools 215 are employed to detect unauthorized encryption by using the concurrent user audit 234, and the third layer monitoring tools 220 are employed to detect unauthorized encryption by using the concurrent session audit 238, each discussed further below in conjunction with FIG. 3.

In some embodiments, the concurrent user audit 234 may evaluate user activity by monitoring user actions that will be used to determine a deviation from an organizational baseline of normal activities related to storage access by a single user. When a user starts to write to the storage system with an unusually large number of encrypted files, the concurrent user audit 234 will detect this abnormal behavior. Likewise, the concurrent session audit 238 monitors the number of concurrent sessions from the same remote host, thereby allowing the storage system 120 to identify additional triggers that will help to detect hostile activity. The sudden growth in the number of concurrent sessions and the storage of encrypted files on storage will help to discover anomalous behavior efficiently. The concurrent user audit 234 and concurrent session audit 238 can obtain a historical baseline for the user behavior by evaluating, for example, log files of the storage system 120.

Generally, the second layer monitoring tool 215 and the third layer monitoring tool 220 provide additional security functionality, in addition to the first layer monitoring tools 210, that determine whether the storage system 120 experiences an unauthorized encryption (for example, by a malware virus and/or by misplaced configurations by users to encrypt a folder). The exemplary second layer monitoring tool 215 and the exemplary third layer monitoring tool 220 differentiate normal behavior of users and the user sessions and abnormal behavior using historical records. The exemplary second and third layer monitoring tools 215, 220 can detect unauthorized encryption that may be missed by the first layer monitoring tools 210 if the malicious actor only applies a ransomware encryption to a smaller percentage (e.g., 50% or 20%) of the files in a folder in order to avoid detection by the first layer monitoring tools 210 using the deduplication efficiency evaluation.

For example, the second layer monitoring tool 215 and the third layer monitoring tool 220 may determine that the normal behavior for a user X suggests that user X usually connects at one console with one session, and that abnormal behavior is therefore observed when user X connects at three consoles with 1,000 sessions.

Figure 3:
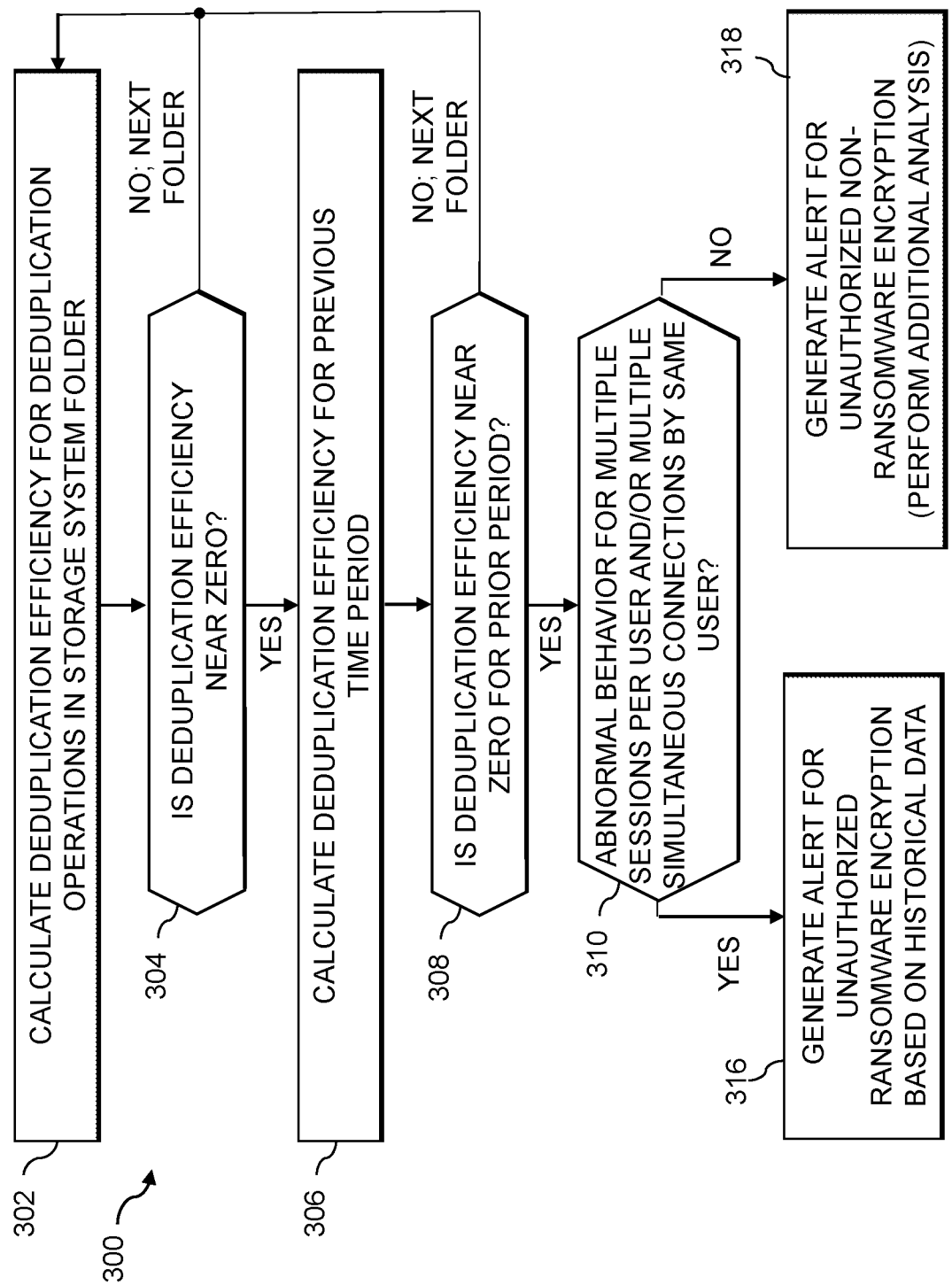
FIGS. 3 and 4 are flow diagrams illustrating exemplary implementations of unauthorized encryption detection processes using one or more deduplication efficiency metrics, according to various embodiments.

FIG. 3 is a flow diagram illustrating an exemplary implementation of an unauthorized encryption detection process 300 that uses one or more deduplication efficiency metrics, according to one or more embodiments. The unauthorized encryption detection process 300 can be executed in at least some embodiments in the different areas of the storage system 120, such as the storage operating system, the storage array, the storage network and the storage configuration data to achieve the multi-layer unauthorized encryption detection discussed above in conjunction with FIG. 2.

As shown in FIG. 3, the exemplary unauthorized encryption detection process 300 initially calculates the deduplication efficiency for deduplication operations in one or more storage system folders at step 302. A test is performed at step 304 to determine if the deduplication efficiency is near zero.

If it is determined at step 304 that the deduplication efficiency is not near zero, then the exemplary unauthorized encryption detection process 300 returns to step 302 to evaluate a next folder. If, however, it is determined at step 304 that the deduplication efficiency is near zero, then the exemplary unauthorized encryption detection process 300 may calculate the deduplication efficiency for a previous time period at step 306 and perform a further test at step 308 to determine if the deduplication efficiency is near zero for the prior period.

In at least some embodiments, the deduplication efficiency for the previous time period may be evaluated to validate that the deduplication efficiency obtained at step 302 is indicative of an unauthorized encryption and is not a temporary or transient reading. It is noted that malware, in general, and ransomware, in particular, often get smarter over time, as well as generally more complex and sophisticated. Thus, in one or more embodiments, the evaluation of the deduplication efficiency for the previous period can aid in detecting such malware as they advance.

If it is determined at step 308 that the deduplication efficiency is not near zero, then the unauthorized encryption detection process 300 returns to step 302 to evaluate a next folder. If, however, it is determined at step 308 that the deduplication efficiency is near zero for the prior period (or determined at step 304 that the deduplication efficiency is near zero, when step 308 is not performed), then the unauthorized encryption detection process 300 performs another test at step 310 to determine if the second and/or third layer monitoring tools 215, 220 detected abnormal behavior for multiple sessions per user and/or multiple simultaneous connections by the same user.

If it is determined at step 310 that abnormal user and/or session behavior was detected then the unauthorized encryption detection process 300 generates an alert for an unauthorized ransomware encryption based on the historical data at step 316.

If, however, it is determined at step 310 that abnormal user and/or session behavior was not detected then the unauthorized encryption detection process 300 generates an alert for an unauthorized non-ransomware encryption at step 318 indicating, for example, that additional analysis may be required.

Figure 4:
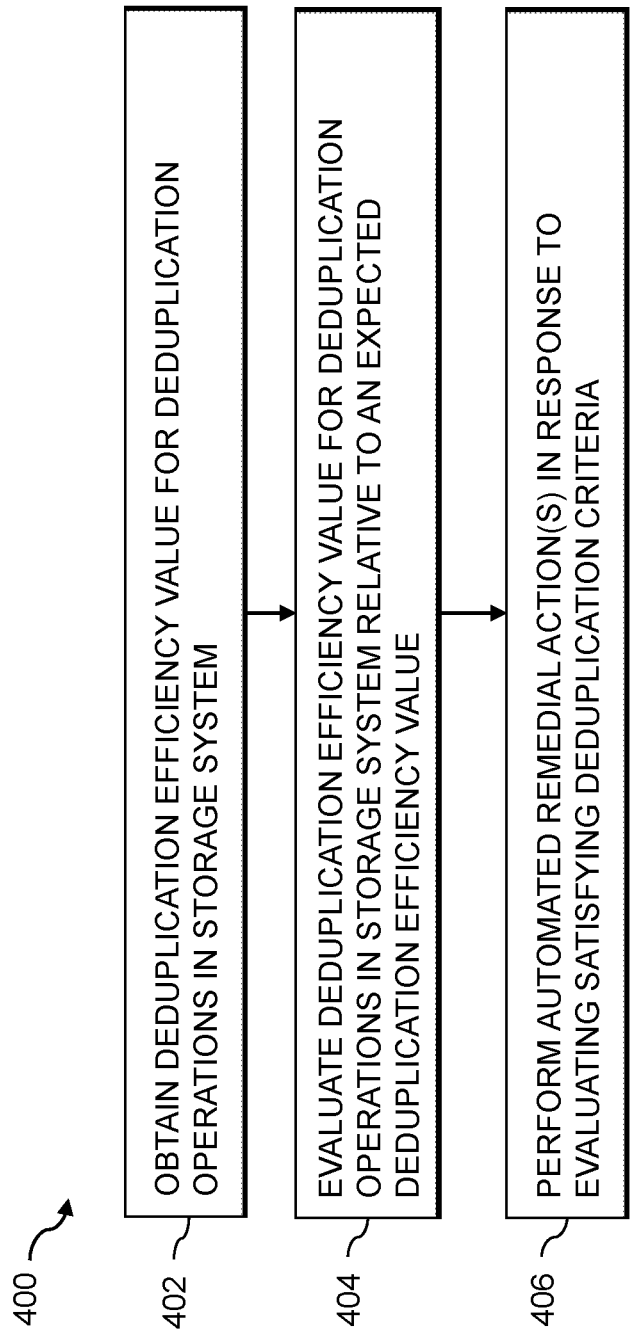

FIG. 4 is a flow diagram illustrating an exemplary implementation of an unauthorized encryption detection process 400 that uses one or more deduplication efficiency metrics, according to some embodiments. As shown in FIG. 4, the exemplary unauthorized encryption detection process 400 initially obtains a deduplication efficiency value for one or more deduplication operations in at least a portion of a storage system at step 402. Thereafter, the exemplary unauthorized encryption detection process 400 evaluates the deduplication efficiency value for the one or more deduplication operations relative to an expected deduplication efficiency value at step 404. For example, the expected deduplication efficiency value may be an approximation based on: (i) a historical deduplication efficiency value for one or more prior deduplication operations; (ii) a deduplication efficiency threshold value (e.g., evaluating whether the deduplication efficiency value falls below a predefined threshold value), and/or (iii) an anomalous deduplication efficiency value associated with an unauthorized encryption (e.g., a deduplication efficiency value near zero).

At step 406, the exemplary unauthorized encryption detection process 400 performs one or more automated remedial actions (e.g., generating an alert notification) in response to the evaluating satisfying one or more deduplication criteria.

In some embodiments, the deduplication efficiency value for the one or more deduplication operations is provided by a deduplication module of the storage system that performed the one or more deduplication operations.

In one or more embodiments, the unauthorized encryption detection process 400 may compare (i) a count of a number of concurrent users to an expected number of concurrent users, and/or (ii) a count of a number of concurrent sessions for a given user to an expected number of concurrent sessions for the given user. The comparing may be performed in response to the evaluating satisfying the one or more deduplication criteria at step 406. A ransomware alert notification may be generated in response to the evaluating and the comparison satisfy one or more ransomware criteria.

The particular processing operations and other network functionality described in conjunction with the flow diagrams of FIGS. 3 and 4 are presented by way of illustrative example only, and should not be construed as limiting the scope of the disclosure in any way. Alternative embodiments can use other types of processing operations to detect unauthorized encryption using one or more deduplication efficiency metrics. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

Upon detection of an encryption anomaly, the unauthorized encryption detector 105 can optionally initiate or execute one or more predefined remedial steps and/or mitigation steps to address the detected anomalies. For example, the predefined remedial steps and/or mitigation steps to address the detected anomalies may comprise the transmission of an alert or alarm to the user device 102 and/or user for important or suspicious events; isolating, removing, quarantining, limiting permissions, analyzing, and deactivating one or more of the user devices 102 and/or one or more files, accounts or aspects of the user devices 102 or the user; notifying one or more third party systems (such as sending an email, or generating an alert in another system); restricting access of one or more accounts and one or more machines from accessing a network, files or folders; initiating a step-up authentication with one or more additional authentication factors; resetting or limiting permissions associated with a file or folder; quarantining one or more files or folders, and preventing one or more further actions from being executed associated with the user devices 102, user account or machine associated with the detected anomalous activity.

CryptoLocker provides an example of how malware authors use encryption for nefarious purposes. CryptoLocker uses 256-bit AES symmetric encryption for the actual file encryption, and asymmetric RSA encryption for communication and securing the symmetric session key.

CryptoLocker has become a blueprint for many other ransomware families that followed, making CryptoLocker a good case study to show how CryptoLocker uses encryption to lock up files.

When CryptoLocker arrives on a system, CryptoLocker comes with nothing more than an RSA (asymmetric) public key, used by the ransomware to establish a secure channel to its command and control server. The ransomware handles communication between itself and the server of the author of the malware via this channel.

The use of public key encryption offers advantages. First, any third parties listening in on the network communication will not be able to see the plaintext messages being exchanged between CryptoLocker and its server. All a malware analyst would see when trying to understand the protocol by sniffing the network traffic is a bunch of encrypted gibberish. In addition, the malware authors not only hide their messages from prying eyes, but also ensure that the server the ransomware is talking to belongs to the malware authors.

As a result, encrypting the communication with RSA ensures its secrecy and its authenticity. This way, a law enforcement agency seizing command and control domains can't simply take over control of the malware by issuing its own commands.

During the communication, CryptoLocker will request a second RSA public key from its server that is unique to the victim. CryptoLocker then goes ahead and creates a 256-bit AES session key that it will use to encrypt the files of the victim. Asymmetric cryptography like RSA is not typically considered to be well-suited for encrypting large amounts of data directly as it is relatively slow compared to its symmetric cousins. Using a symmetric algorithm like AES to encrypt the bulk of the user data is therefore often considered more efficient.

As a final step, CryptoLocker encrypts the 256-bit AES key using the victim-specific, asymmetric RSA public key and stores it together with the encrypted file data.

Once the encryption process finishes, the ransomware will erase the AES session key from its memory, making sure no trace is left anywhere. Only the owner of the victim's private key, which was generated and is stored only on the malware author's server, is able to decrypt the AES session key from within the encrypted files and decrypt the files again once the victims have paid the ransom.

Ransomware often leverages the advantages of both asymmetric and symmetric encryption to lock up the victim's files within a matter of seconds, rather than hours. Recovering them without paying the criminals is often nearly impossible.

The disclosed techniques for detection of unauthorized encryption using one or more deduplication efficiency metrics can be employed to detect such anomaly encryption.

In some embodiments, the disclosed unauthorized encryption detection techniques can be integrated and/or provided within one or more devices of a storage system to detect unauthorized encryption without a significant impact on performance (since the monitoring tools will largely be in a monitor state and will only be in an alert state for a small percentage of time).

In addition, the disclosed unauthorized encryption detection techniques protect against ransomware attacks and permit run-time detection of unauthorized encryption by evaluating the one or more of the deduplication efficiency, concurrent users and concurrent user sessions.

One or more embodiments of the disclosure provide improved methods, apparatus and computer program products for detection of unauthorized encryption using one or more deduplication efficiency metrics. The foregoing applications and associated embodiments should be considered as illustrative only, and numerous other embodiments can be configured using the techniques disclosed herein, in a wide variety of different applications.

It should also be understood that the disclosed unauthorized encryption detection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for detection of unauthorized encryption using one or more deduplication efficiency metrics may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based unauthorized encryption detection engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based unauthorized encryption detection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
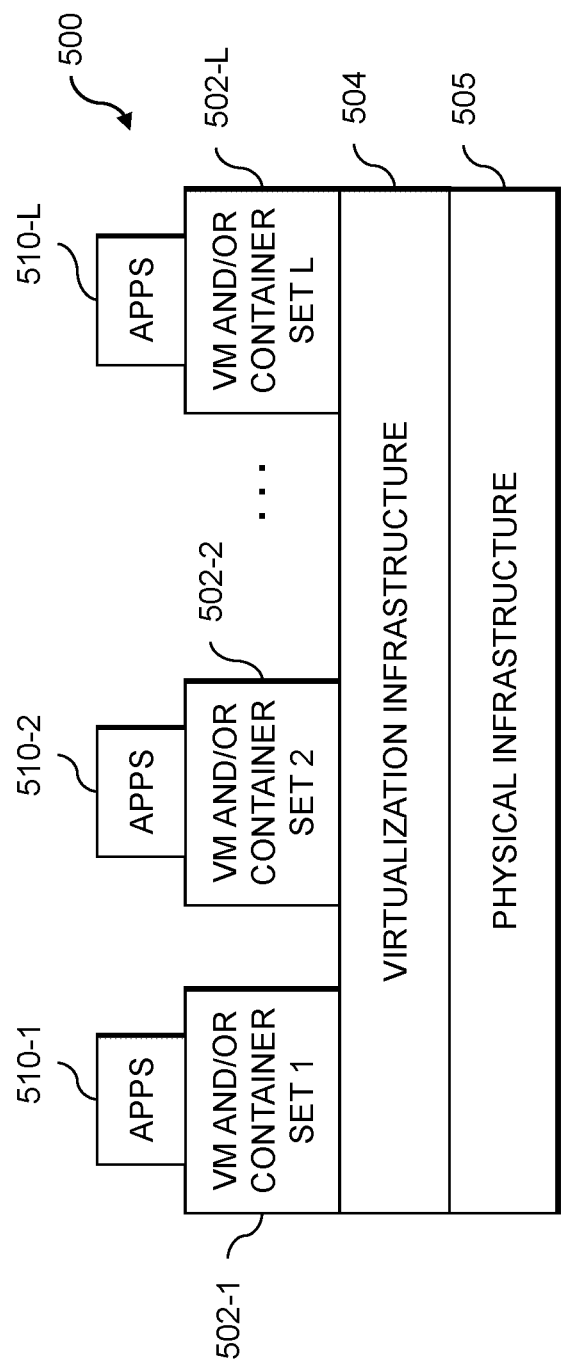
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide unauthorized encryption detection functionality of the type described above for one or more processes running on a given one of the VMs. For example, each of the VMs can implement unauthorized encryption detection control logic and associated alert generation functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide unauthorized encryption detection functionality of the type described above for one or more processes running on different ones of the containers. For example, a container host device supporting multiple containers of one or more container sets can implement one or more instances of unauthorized encryption detection control logic and associated alert generating functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a WAN, a LAN, a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an ASIC, an FPGA or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
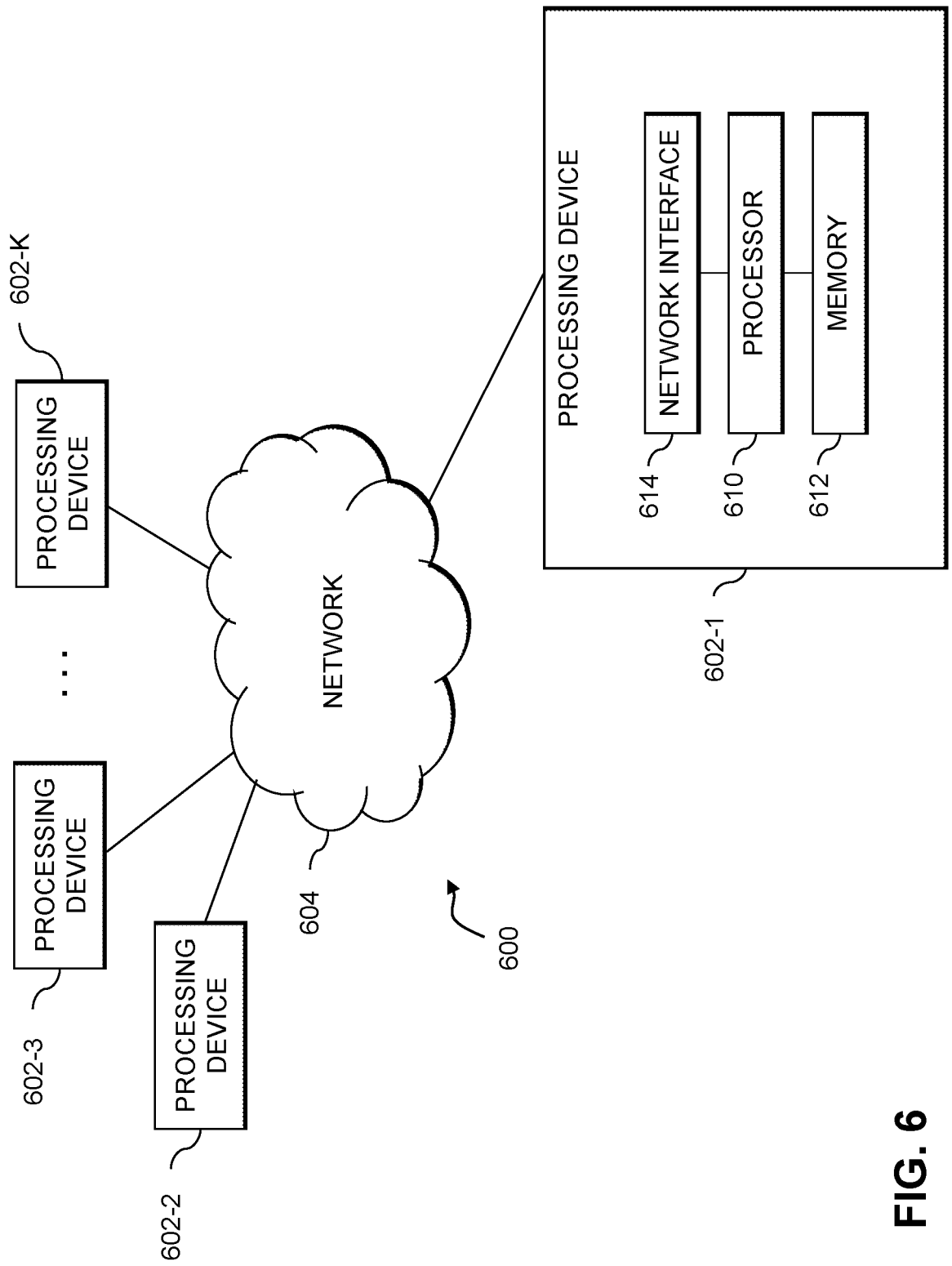
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a deduplication efficiency value for one or more deduplication operations in at least a portion of a storage system;
evaluating, by at least one processing device of the storage system, the deduplication efficiency value for the one or more deduplication operations relative to an expected deduplication efficiency value, wherein the expected deduplication efficiency value comprises one or more of: (i) a deduplication efficiency threshold value indicative of an unauthorized encryption, and (ii) an anomalous deduplication efficiency value associated with an unauthorized encryption; and
performing one or more automated remedial actions in response to the evaluating satisfying one or more deduplication criteria;
wherein the method is performed by the at least one processing device comprising a processor coupled to a memory.

2. The method of claim 1, wherein the deduplication efficiency value for the one or more deduplication operations is provided by a deduplication module of the storage system that performed the one or more deduplication operations.

3. The method of claim 1, wherein the one or more automated remedial actions comprise generating an unauthorized encryption alert notification in response to the evaluating satisfying the one or more deduplication criteria.

4. The method of claim 1, further comprising comparing one or more of: (i) a count of a number of concurrent users to an expected number of concurrent users, and (ii) a count of a number of concurrent sessions for a given user to an expected number of concurrent sessions for the given user.

5. The method of claim 4, wherein the comparison is performed in response to the evaluating satisfying the one or more deduplication criteria.

6. The method of claim 5, wherein a ransomware alert is generated when the evaluating and the comparison satisfy one or more ransomware criteria.

7. The method of claim 5, further comprising generating an unauthorized encryption alert notification in response to the comparison satisfying one or more concurrency criteria.

8. The method of claim 1, wherein the expected deduplication efficiency value further comprises a historical deduplication efficiency value for one or more prior deduplication operations.

9. An apparatus comprising:
at least one processing device comprising a processor coupled to a memory;
the at least one processing device being configured to implement the following steps:
obtaining a deduplication efficiency value for one or more deduplication operations in at least a portion of a storage system;
evaluating, by the at least one processing device of the storage system, the deduplication efficiency value for the one or more deduplication operations relative to an expected deduplication efficiency value, wherein the expected deduplication efficiency value comprises one or more of: (i) a deduplication efficiency threshold value indicative of an unauthorized encryption, and (ii) an anomalous deduplication efficiency value associated with an unauthorized encryption; and
performing one or more automated remedial actions in response to the evaluating satisfying one or more deduplication criteria.

10. The apparatus of claim 9, wherein the deduplication efficiency value for the one or more deduplication operations is provided by a deduplication module of the storage system that performed the one or more deduplication operations.

11. The apparatus of claim 9, wherein the one or more automated remedial actions comprise generating an alert notification in response to the evaluating satisfying the one or more deduplication criteria.

12. The apparatus of claim 9, further comprising comparing one or more of: (i) a count of a number of concurrent users to an expected number of concurrent users, and (ii) a count of a number of concurrent sessions for a given user to an expected number of concurrent sessions for the given user.

13. The apparatus of claim 12, wherein the comparison is performed in response to the evaluating satisfying the one or more deduplication criteria and wherein a ransomware alert is generated when the evaluating and the comparison satisfy one or more ransomware criteria.

14. The apparatus of claim 13, further comprising generating an unauthorized encryption alert notification in response to the comparison satisfying one or more concurrency criteria.

15. A non-transitory processor-readable storage medium having stored therein program code of one or more software programs, wherein the program code when executed by at least one processing device causes the at least one processing device to perform the following steps:
obtaining a deduplication efficiency value for one or more deduplication operations in at least a portion of a storage system;
evaluating, by the at least one processing device of the storage system, the deduplication efficiency value for the one or more deduplication operations relative to an expected deduplication efficiency value, wherein the expected deduplication efficiency value comprises one or more of: (i) a deduplication efficiency threshold value indicative of an unauthorized encryption, and (ii) an anomalous deduplication efficiency value associated with an unauthorized encryption; and
performing one or more automated remedial actions in response to the evaluating satisfying one or more deduplication criteria.

16. The non-transitory processor-readable storage medium of claim 15, wherein the deduplication efficiency value for the one or more deduplication operations is provided by a deduplication module of the storage system that performed the one or more deduplication operations.

17. The non-transitory processor-readable storage medium of claim 15, wherein the one or more automated remedial actions comprise generating an alert notification in response to the evaluating satisfying the one or more deduplication criteria.

18. The non-transitory processor-readable storage medium of claim 15, further comprising comparing one or more of: (i) a count of a number of concurrent users to an expected number of concurrent users, and (ii) a count of a number of concurrent sessions for a given user to an expected number of concurrent sessions for the given user.

19. The non-transitory processor-readable storage medium of claim 18, wherein a ransomware alert is generated when the evaluating and the comparison satisfy one or more ransomware criteria.

20. The non-transitory processor-readable storage medium of claim 18, further comprising generating an unauthorized encryption alert notification in response to the comparison satisfying one or more concurrency criteria.

* * * * *

UNITED STATES PATENT AND TRADEMARK OFFICE
CERTIFICATE OF CORRECTION

| | |
|---|---|
| PATENT NO. | : 11,822,656 B2 |
| APPLICATION NO. | : 17/083428 |
| DATED | : November 21, 2023 |
| INVENTOR(S) | : Yevgeni Gehtman et al. |

It is certified that error appears in the above-identified patent and that said Letters Patent is hereby corrected as shown below:

On the Title Page

Item (57) In the Abstract, Line 12, replace "and/or (ii) a count of a number of concurrent sessions for a" with -- and/or a count of a number of concurrent sessions for a --

Signed and Sealed this
Twenty-sixth Day of December, 2023

*Katherine Kelly Vidal*

Katherine Kelly Vidal
*Director of the United States Patent and Trademark Office*